United States Patent
Theriault et al.

[11] 3,839,152
[45] Oct. 1, 1974

[54] PREPARATION OF NOVEL DERIVATIVES OF 2,3 DIHYDROXYPROPYL-N-(7 OR 8 CHLORO-4 QUINOLINYL)ANTHRANILATE

[75] Inventors: Robert John Theriault, Kenosha, Wis.; James Paul Karwowski, Mundelein; Norman Earl Wideburg, Waukegan, both of Ill.

[73] Assignee: Abbott Laboratories, Chicago, Ill.

[22] Filed: May 10, 1973

[21] Appl. No.: 359,141

Related U.S. Application Data

[62] Division of Ser. No. 190,690, Oct. 19, 1971, Pat. No. 3,790,578.

[52] U.S. Cl. ............................ 195/51 R, 195/30
[51] Int. Cl. ............................. C12d 13/00
[58] Field of Search ................... 195/30, 51 R

[56] References Cited
UNITED STATES PATENTS
3,453,179  7/1969  Greenspan et al. ............... 195/51 R Primary Examiner—Alvin E. Tanenholtz
Attorney, Agent, or Firm—Robert L. Niblack; Joyce R. Krei; Vincent A. Mallare

[57] ABSTRACT

A process of preparing novel derivatives of 2,3-dihydroxypropyl-N-(7 or 8-chloro-4-quinolinyl) anthranilate. The compounds are represented by the formula

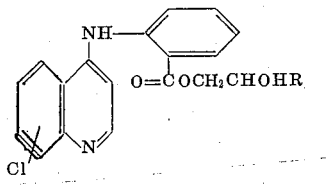

wherein the chloro is in the 7- or 8-position and R is —$CH_2OCH_3$. The compounds are prepared by microbial transformation of 2,3-dihydroxypropyl-N-(7 or 8-chloro-4-quinolinyl)anthranilate. The compounds are useful as analgesic and anti-inflammatory agents.

1 Claim, No Drawings

PREPARATION OF NOVEL DERIVATIVES OF 2,3 DIHYDROXYPROPYL-N-(7 OR 8 CHLORO-4 QUINOLINYL)ANTHRANILATE

This is a division, of application Ser. No. 190,690 filed Oct. 19, 1971 now U.S. Pat. No. 3,790,578.

DETAILED DESCRIPTION OF THE INVENTION

This invention relates to novel derivatives of 2,3-dihydroxypropyl-N-(7 or 8-chloro-4-quinolinyl)anthranilate and to a process for preparing the compounds via microbial transformation.

A number of humans and animals are known to suffer from various rheumatic conditions involving inflammation, swelling, tenderness, decreased mobility, pain and fever. While there are presently available anti-inflammatory agents which have been found to be effective in the symptomatic treatment of such conditions as rheumatoid arthritis, rheumatoid spondylitis, osteoarthritis, gouty arthritis, and the like, such agents have a number of undesirable side effects. Thus, the search for improved anti-inflammatory agents continues.

The present invention provides novel compounds which are effective anti-inflammatory agents and further provides novel analgesic agents.

Accordingly, it is a primary object of this invention to provide novel derivatives of 2,3-dihydroxypropyl-N-(7 or 8-chloro-4-quinolinyl)anthranilate.

A further object is to provide therapeutic compositions for the relief of inflammation and the accompanying pain, swelling, fever and the like in warm-blooded mammals.

Still a further object is to provide methods for treating inflammation and/or pain in mammals.

Further objects will become apparent to those skilled in the art from the following description and claims.

The compounds of this invention are represented by general Formula I

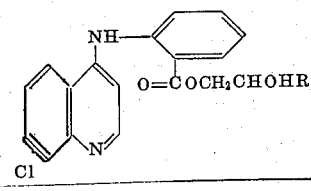

wherein the chloro is in the 7- or 8-position and R is —CH$_2$OCH$_3$.

The compounds of Formula I are mild, aspirin-like analgesic agents when administered orally to warm-blooded mammals in dosages of from 200–300 mg./kg. daily, preferably in divided doses, e.g., 4 to 6 times daily. The analgesic activity was initially established in the acetic acid writhing assay. (Whittle, Brit. J. Pharmcol., 22: 246 [1964]).

In addition to the analgesic activity, the compounds additionally exhibit anti-inflammatory activity at oral dosages of from 5 to 300 mg./kg. of body weight daily. The anti-inflammatory activity of the compounds was first established in the carrageen rat paw edema test, wherein the 7-chloro compound exhibits an ED$_{25}$ of 13.5 mg./kg. (Winter et al, Proc. Soc. Exp. Biol, Med., 111, 554 [1962]).

Therapeutic compositions comprising, as their active ingredient(s), one or more compounds of Formula I, in association with a pharmaceutically acceptable diluent or carrier and methods for treating pain and inflammation, are also provided by this invention. The compounds are generally administered to mammals in dosages of from 20 to 300 mg./kg. of body weight daily to obtain the desired therapeutic effect.

Compounds of this invention are:
2-Hydroxy-3-methoxypropyl-N-(7-chloro-4-quinolinyl)anthranilate
2-Hydroxy-3-methoxypropyl-N-(8-chloro-4-quinolinyl)anthranilate The compounds of this invention can be prepared by subjecting the appropriate compound of Formula II to microbial transformation using Basidiomycete species U Bas 8 (F-55) NRRL-3941 according to the following reaction sequence:

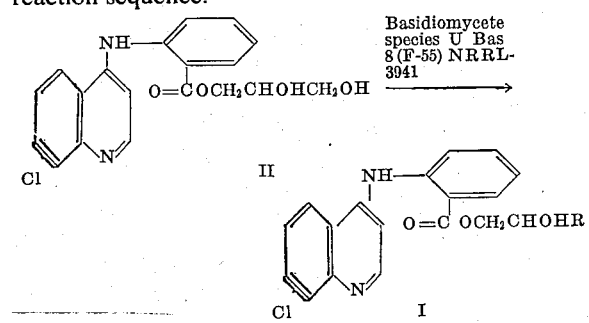

wherein the chloro is in the 7- or 8-position. The synthesis of the compounds of Formula II, 2,3-dihydroxypropyl-N-(7-chloro-4-quinolinyl)anthranilate and 2,3-dihydroxypropyl-N-(8-chloro-4-quinolinyl)anthranilate, are described in Belgian Patent Numbers 678,551, published Sept. 28, 1966 (8-chloro) and 636,381, published Feb. 20, 1964 (7-chloro). The compounds of Formula II also exhibit anti-inflammatory and analgesic activity.

The following fermentation media are used in the practice of this invention:

Fermentation Media

| A | Grams/liter |
| --- | --- |
| Glucose monohydrate (added post sterilization) | 50.0 |
| Soy fluff flour | 5.0 |
| Yeast extract | 5.0 |
| KH$_2$PO$_4$ | 2.3 |
| K$_2$HPO$_4$ | 0.84 |

The pH is adjusted to approximately 6.5 and deionized water is added to adjust the volume to 1.0 liter.

The following examples further illustrate this invention.

Example 1

Preparation of 2-Hydroxy-3-Methoxypropyl-N-(7-Chloro-4-Quinolinyl)Anthranilate

Basidiomycete species U Bas-8 (F-55) NRRL-3941 was inoculated from 14 day incubated agar slant cultures into a series of sterile cotton plugged 500 ml. Erlenmeyer flasks each containing 100 ml. of fermentation medium A. The inoculated flasks were incubated on a Gump rotary shaker (250 rpm's) at 28°C. for 48 hours to 72 hours. At that time, 0.05–0.1 percent of 2,-3-dihydroxypropyl-N-(7-chloro-4-quinolinyl)- anthranilate or 0.05–0.1 percent of 2,3-dihydroxypropyl-N-(8-chloro-4-quinolinyl)anthranilate (50 mg./100 ml. medium) was added in powdered form. The flasks were again incubated on the shaker and were sampled at various ages during the fermentation for thin-layer chromatography (TLC) analysis in order to determine the optimum harvest age as follows: 10 ml. of whole culture were adjusted to pH 9.0 with $NH_4OH$. One volume of acetone was added with mixing and the samples were then extracted with 2 volumes of ethyl acetate, twice. The ethyl acetate extracts were dried in vacuo and the residue obtained was reconstituted in 2 ml. of ethanol. The ethanol solutions were spotted (200 microliters) on 20 cm × 20 cm glass plates coated with Merck-Darmstadt silica gel $GF^{254}$ about 500 microns in thickness. The thin-layer chromatography (TLC) plates were developed in a solvent system consisting of $CHCl_3:CH_3OH:NH_4OH$ (85:15:1). The substrate and microbial conversion product were revealed on TLC plates as dark UV absorbing spots with 254 nm UV light and orange to brown spots after the plates were sprayed with Dragendorff's reagent. Thin-layer chromatography $R_f$'s of the substrate and resulting microbial conversion product are shown in Table I.

TABLE I

| (85:15:1) Solvent System | | TLC | |
| Culture | Substrate | Substrate $R_f$ | Product $R_f$ |
|---|---|---|---|
| Basidiomycete species U Bas-8 (F-55) NRRL-3941 | 2,3-dihydroxy-propyl-N-(7-chloro-4-quino-linyl)anthra-nilate | 0.60 | 0.80 |
| Basidiomycete species U Bas-8(F-55) NRRL-3941 | 2,3-dihydroxy-propyl-N-(8-chloro-4-(quino linyl)anthra-nilate | 0.60 | 0.85 |

Example 2

Preparation of 2-Hydroxy-3-Methoxypropyl-N-(7-chloro-4-Quinolinyl)Anthranilate

Basidiomycete species F-55, NRRL-3941, was inoculated at a level of one 14 day agar slant culture suspension per flask to approximately 200 sterile, cotton-plugged 500 ml. Erlenmeyer flasks each containing 100 ml. of medium A. The flasks were incubated on a Gump rotary shaker (250 rpm at 28°C. for 72 hours, at which time 0.05 percent (50 mg./100 ml. of medium) of 2,3-dihydroxypropyl-N-(7-chloro-4-quinolinyl)anthranilate was added to each flask in powdered form. The flasks were again incubated on the shaker and were sampled at various ages, as described in Example 1, for thin-layer chromatography analysis in order to determine the optimal age for harvest. When the optimal yield of the microbial conversion product was reached, all flasks were harvested and the whole culture from each flask was pooled and adjusted to pH 2. The whole culture was filtered and the mycelium discarded after washing the pH 2 water. The filtered fermentation beer was concentrated to one-fifth volume under vacuum at 30°C. and then adjusted to pH 9 with $NH_4OH$. The concentrated pH 9 beer was then extracted once with 2 volumes of ethyl acetate. The ethyl acetate extract was dried under vacuum and redissolved in 23A ethyl alcohol: $H_2O(75:25)$. This solution was filtered to remove any precipitate and the clear solution was extacted with 3 volumes of $CCl_4$. The $CCl_4$ extract was dried and chromatographed on a LH-20 Sephadex column packed by the slurry method and developed with a solvent solution consisting of heptane:$CHCl_3$: 23A ethyl alcohol (10:8:2). The major microbial conversion product, 2-hydroxy-3-methoxy-N-(7-chloro-4-quinolinyl)anthranilate, m.p. 171°–173°, was crystallized directly from column eluate fractions. The 100 MHz nmr spectrum was consistent with the following structure:

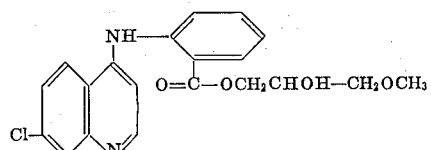

The mass spectrum confirmed this structure and gave a molecular ion $(M)^+$ of 386.1012 ($C_{20}H_{19}N_2O_4Cl$)

Analysis Calcd. for $C_{20}H_{19}N_2O_4Cl$: C, 62.09; H, 4.95; N, 7.24; O, 16.55
Found: C, 61.91; H, 4.97; N, 7.19; O, 16.55

While the compound can be administered alone, that is, as the sole component in a filled capsule, it is preferred to formulate the compound in various dosage forms for oral administration such as tablets, syrups and the like. Such dosage forms are prepared by methods well known in the art and generally include a pharmaceutically acceptable carrier or diluent such as lactose, starch or sucrose along with lubricating agents such as magnesium stearate and flavoring and sweetening agents and the like.

What is claimed is:
1. A process of preparing a compound

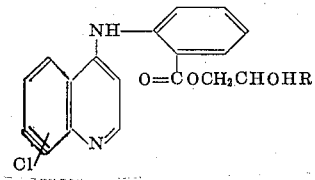

wherein the chloro is in the 7- or 8-position and R is —$CH_2OCH_3$, said process comprising culturing Basidiomycete species NRRL-3941 in a nutrient medium containing suitable sources of carbon, nitrogen and minerals in the presence of a second compound of the formula

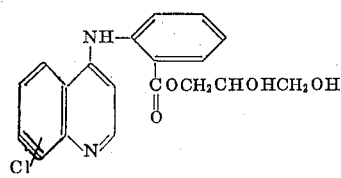

wherein the chloro is in the 7- or 8-position for a sufficient length of time to transform said second compound to said desired compound.

* * * * *